May 26, 1931. R. K. HOPKINS 1,807,531
PIPE FLANGING AND UPSETTING MACHINE
Filed Aug. 7, 1929
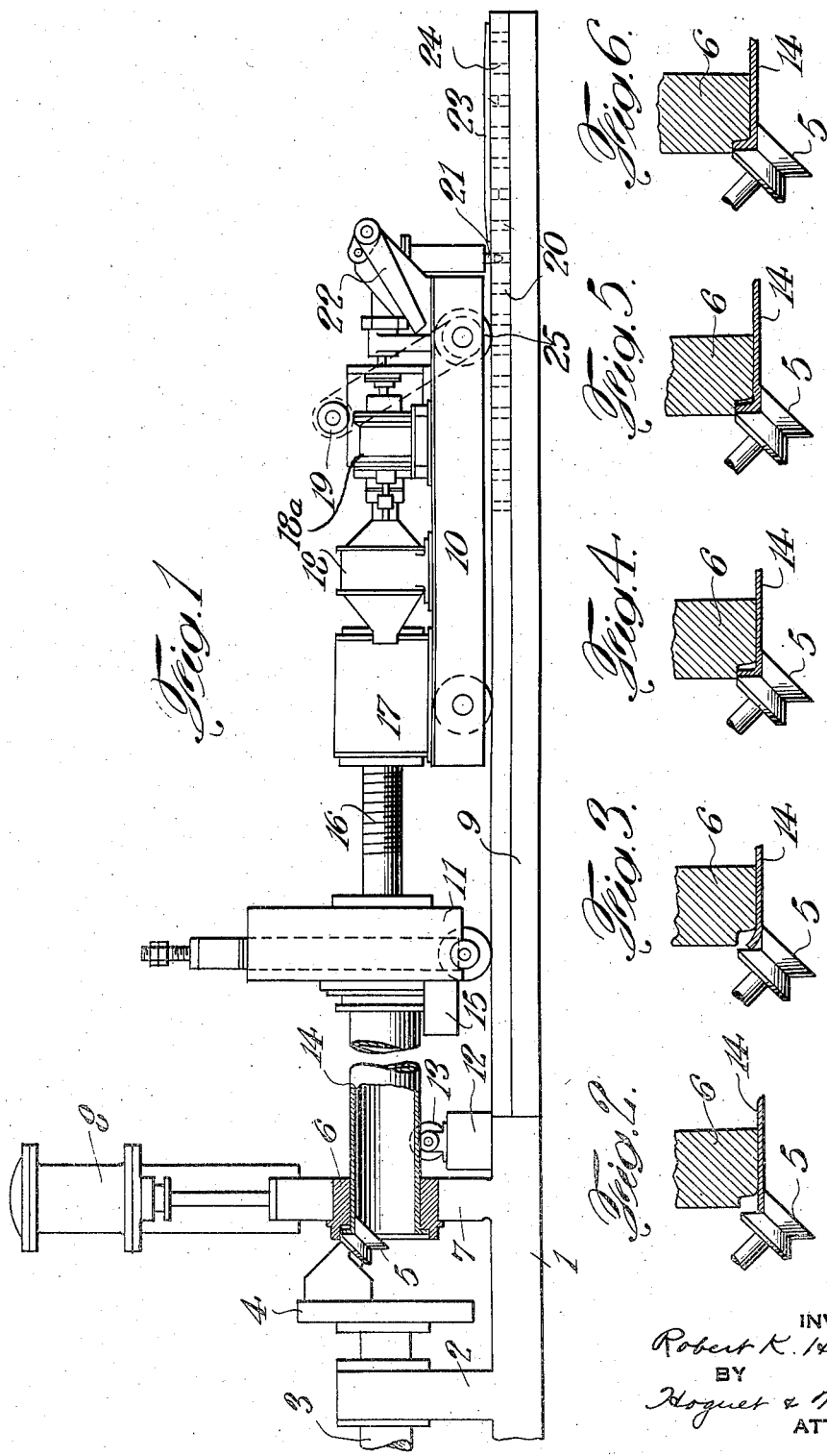
INVENTOR
Robert K. Hopkins
BY
Hoguet & Neary
ATTORNEY Patented May 26, 1931

1,807,531

UNITED STATES PATENT OFFICE

ROBERT K. HOPKINS, OF NEW YORK, N. Y., ASSIGNOR TO THE M. W. KELLOGG COMPANY, OF NEW YORK, N. Y., A CORPORATION OF DELAWARE

PIPE FLANGING AND UPSETTING MACHINE

Application filed August 7, 1929. Serial No. 384,081.

This invention relates to a pipe flanging machine and more particularly to a machine for rolling and upsetting a flange on the end of a pipe.

An object of the invention is to provide a machine for rolling a flange of any desired thickness or cross-section on the end of a pipe.

Another object of the invention is to provide a novel indexing means whereby a pipe, which has once been properly positioned for performing a flanging or similar operation on the end thereof, may be removed from its position and returned thereto, or completely removed and reversed preparatory to performing a similar operation upon the other end without the necessity of further adjustment of the machine.

The apparatus of the present invention has the particular advantage over the prior art constructions, that flanges of any desired thickness can be produced on the end of a pipe of lesser wall thickness, the metal for such flange being supplied from the pipe walls without the danger of buckling of the pipe walls that would attend such upsetting operations, if attempted to be carried out in any prior apparatus with which I am familiar.

In carrying out the invention the end of the pipe to be flanged is firmly clamped in a die which determines the shape of the flange while the other end rests against a movable cross-head adapted to be moved either integrally with or relatively to a carriage traveling upon ways which are part of the base of the machine. A face plate carrying rolling means which may comprise a roller or rollers for rolling the flange and associated with means for imparting thereto a rotary motion and longitudinal motion with reference to the pipe is provided. During the flanging operation the rolling means is caused to rotate about the periphery of the pipe while at the same time it is moved toward the pipe, thereby causing the flange to be turned back into the die. After the flange has been rolled to the required diameter longitudinal motion of the rolling means is stopped and the pipe in turn moved toward the rolling means, the latter, however, still maintaining its rotary motion. This process causes upsetting of the metal in the end of the pipe which flows up the rear of the flange. When the flange has acquired its proper thickness the movement of the pipe is stopped and the longitudinal motion again imparted to the rolling means in order to make the back of the flange conform to the shape of the die.

During the rolling process it may be necessary to withdraw the pipe from the die in order to reheat the end to be flanged. In order to obviate the necessity of readjusting the pipe in the die the invention provides indexing means. During the rolling process the carriage which provides longitudinal motion to the pipe is firmly locked in position by a pin or pins which project into holes in the ways upon which the carriage travels. A plate is provided which is positioned so as to cover the holes in the ways which are adjacent to those in which the locking pins project. As the pipe is withdrawn from the die these pins ride upon the plate and upon return merely drop off the plate into the first uncovered hole thereby positioning the pipe in the die without further adjustment. The indexing means also permits the pipe to be withdrawn and reversed preparatory to performing a similar operation on the other end without the necessity of readjusting the machine.

A better understanding of the invention may be had from the following description together with the accompanying drawings of which Fig. 1 represents a side elevation of a machine embodying the invention with a partial section taken through the pipe and the die, and Figs. 2 to 6 represent various positions of the roll with reference to the pipe during the process of flanging.

Referring to Fig. 1 the pipe flanging machine comprises the base 1 upon which is mounted a standard 2, supporting bearings for the shaft 3 which carries the face plate 4 upon which is mounted a roll 5. Some suitable means, as for instance an electric motor, not shown, may be used to turn the shaft 3. Means also not shown are provided for imparting longitudinal motion to the shaft in both directions. A die for forming the flange on the pipe is shown at 6 in section, and is preferably made in two parts, the lower of which is supported in a standard 7 and the upper of which is suspended from an hydraulic cylinder 8, by means of which it is moved up and down and, when in use, held in closed position. Adjacent the base 1 are a plurality of ways 9 upon which a carriage 10 and a cross-head 11 travel. Near the die supporting means is a support 12 carrying a roller 13 which supports one end of the pipe 14 during the flanging process. The support 12 is equipped with an air cylinder, not shown, whereby vertical movement may be imparted to one end of the pipe. The other end of the pipe is carried by a platform 15 on the cross-head 11, which is also preferably operated by an air cylinder, not shown, which provides a vertical movement for the other end of the pipe, the purpose of which will be hereinafter described.

The cross-head 11 in addition to being capable of moving integrally with carriage 10 may also be moved with reference to the carriage by means of the screw 16 which is given longitudinal motion by a threaded collar, not shown, mounted in the housing 17. The carriage 10 also carries a motor 18, which is connected through the gear reducer 18a and other suitable gearing, not shown, to turn the collar in the housing 17. The motor 18 may also be connected through a suitable driving mechanism 19 to transmit power to the carriage wheels 25, or the driving mechanism may be connected to another motor carried on the carriage 10. Spaced at intervals along the ways are indexing holes 20 which are adapted to receive a locking pin 21, which may be raised and lowered by the handle 22 on the carriage. A plate 23 has pins 24 properly spaced to be received by some of the indexing holes 20 to prevent horizontal movement thereof with reference to the ways. The plate may be placed in any position along the ways and during the flanging operation is positioned so as to cover a plurality of the exposed indexing holes immediately adjacent the locking pin 21 as shown. The purpose of the plate will be apparent as the description of the invention proceeds.

In operation, one end of the pipe to be flanged is clamped in the cross-head 11 while the other end is placed on the roller 13 and brought to the proper position in the die. A rough adjustment is obtained by moving the carriage until the pin 21 is over the hole 20 which brings the end of the pipe nearest to the proper position for commencing the flanging operation. The final adjustment is made by means of the screw 16. The initial relative positions of the roll, die and pipe are shown in Fig. 2. As mentioned above, the plate 23 is placed upon the ways so as to cover the indexing holes immediately to the right of the hole in which the pin 21 rests. During the flanging operation it may be necessary to withdraw the flange from the die and to reheat it in some suitable manner. This is facilitated by means of the plate 23, heretofore described, since during the withdrawing and replacing of the pipe the pin 21 rides on the plate 23. Upon the return of the pipe the pin 21 simply drops off the plate into the proper hole. An accurate method of indexing the pipe to its proper position is thus provided.

In order to roll the flange the rolling means 5 carried by the face plate 4 is brought up against the end of the pipe as shown in Fig. 2. The face plate is turned by the shaft 6 while simultaneously therewith longitudinal motion toward the pipe is imparted to the rolling means until the pipe is slightly flanged outwardly as shown in Fig. 3. An additional longitudinal movement will finally turn the pipe back into the die as shown in Fig. 4. At this point the face plate is held stationary as regards longitudinal movement, but continues to rotate. The motor 18 is then started and the screw 16 turned, thereby moving the cross-head 11 forward pushing the pipe through the die toward the rolling means 5. This causes upsetting of the metal in the pipe which flows up the back of the flange as shown in Fig. 5. When sufficient upsetting has occurred to give the flange its proper thickness longitudinal motion of the pipe is stopped. Longitudinal motion is again imparted to the rolling means until the back of the flange has been smoothed out in accordance with the shape of the die. This is illustrated in Fig. 6. Thus, in accordance with this invention a flange of any desirable thickness may be rolled on the end of a pipe regardless of the thickness of its walls while at the same time the back of the flange may be given any desirable shape as determined by the die used.

In order to withdraw the pipe from the machine, preparatory to flanging the other end, the die is opened by means of the hydraulic cylinder 8 and the pipe raised by the air cylinders, not shown, mounted on the support 12 and the cross-head 11 a distance sufficient to permit the flange to clear the lower half of the die. The locking pin 21 is then raised and the carriage withdrawn until the end of the pipe is clear of the die clamping arrangement whereupon the pipe may be reversed and quickly indexed to its proper position in the die by moving the carriage to the left, as shown in the drawing, until the pin 21 drops off plate 23 into the proper hole. The pipe is then lowered into its proper position by means of the air cylinders above mentioned and the die properly clamped, ready for the second flanging operation. Prior to the initial flanging operation and as often thereafter as may be necessary, the pipe is heated in some suitable way. A similar operation, except that the pipe need not be reversed, may be employed when the pipe is withdrawn for reheating.

Although the invention has been described with reference to the particular embodiment of the machine shown in the drawing it is obvious that such machines may assume a variety of forms within the spirit of the invention which is to be limited, therefore, only by the scope of the appended claims.

I claim:

1. In a metal working machine, the combination with a supporting frame of a carriage for moving the work into the working zone, indexing holes in said frame, means on said carriage co-operating with said holes for locking the carriage during the working operation, and means associated with said frame to insure that said locking means will be returned to the same holes when a removal and replacement of said work is effected.

2. In a metal working machine, the combination with a supporting frame of a carriage for moving the work into a working zone, a plurality of indexing holes in said frame, locking means associated with said carriage for projecting into said indexing holes, and means associated with said frame for causing said locking means to ride over certain of said indexing holes when removal and replacement of the work is effected.

3. In a metal working machine, the combination with a supporting frame of a carriage for adjusting the work to its proper position in the working zone, a plurality of indexing holes spaced along said supporting frame, locking means associated with said carriage for projecting into certain of said holes as determined by the length of said work, and a plate for covering other holes upon which said locking means may ride during removal and replacement of said work.

4. In a pipe flanging machine, the combination with a die and rolling means for flanging the end of a pipe, of a carriage for adjusting the pipe to its proper position in the die, supporting ways for said carriage, indexing holes at suitable intervals along said ways, locking means associated with said carriage, to properly co-act with certain of said holes during the flanging of said pipe, and means comprising a plate covering the holes next adjacent the one co-acting with the locking means upon which the locking means may ride during removal and replacement of the work.

5. In a pipe flanging machine, a die for forming a flange on a pipe having a thickness greater than the wall of the pipe, rolling means co-operating with the die to act upon the end of a pipe held in the die, a cross-head for supporting the pipe in operative relation to the die, a carriage operatively connected to the cross-head for positioning and withdrawing a pipe from the die, and screw means connecting the cross-head and the carriage and adapted to move the cross-head toward and away from the carriage and to advance the pipe carried by the cross-head through the die toward the roll to effect an upsetting action thereon.

In testimony whereof, I have signed my name to this specification this first day of August 1929.

ROBERT K. HOPKINS.